Nov. 24, 1931.  A. E. SPINASSE  1,833,382
METHOD OF AND APPARATUS FOR DRAWING GLASS
Filed July 31, 1926
Fig. 1.
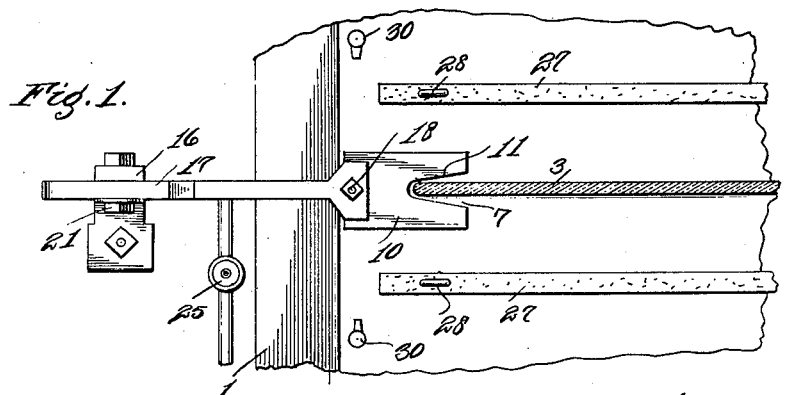
Fig. 4.
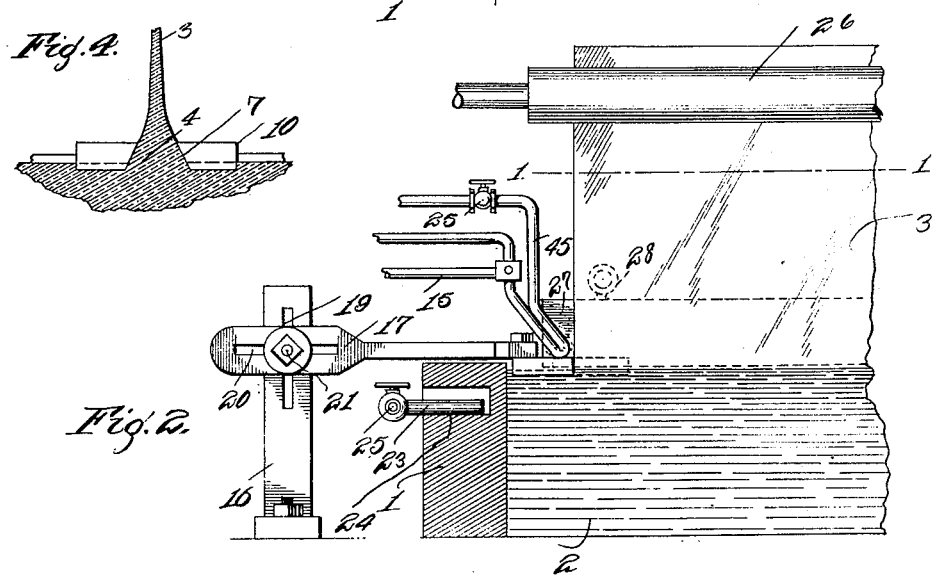
Fig. 2.
Fig. 3.
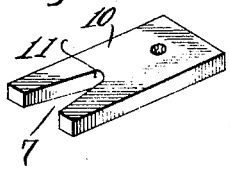
Fig. 5.
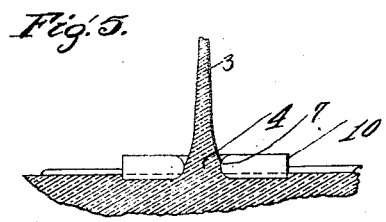
Inventor
Arthur E. Spinasse Patented Nov. 24, 1931

1,833,382

UNITED STATES PATENT OFFICE

ARTHUR E. SPINASSE, OF MOUNT VERNON, OHIO, ASSIGNOR TO PITTSBURGH PLATE GLASS COMPANY, A CORPORATION OF PENNSYLVANIA

METHOD OF AND APPARATUS FOR DRAWING GLASS

Application filed July 31, 1926. Serial No. 126,289.

The present invention relates to improvements in method of and apparatus for drawing glass, and is a continuation in part of my similarly entitled co-pending application Serial No. 702198, filed March 27, 1924.

It is an object of the invention to provide an improved method and apparatus for drawing the flat sheets of glass of substantially uniform thickness to and including the edges or margin portions of the sheet, and to prevent the shrinking inwardly of the edges of the sheet as the sheet is drawn upwardly from the glass bath.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary top plan view of an apparatus constructed according to the present invention.
Figure 2 is a vertical section through the same.

Figure 3 is a perspective view of one of the slot members employed.

Figure 4 is an end view of the slot member showing a portion of the glass bath and the glass sheet drawn therethrough, and Figure 5 is a similar view showing a slight modification.

Referring more particularly to the drawings, 1 designates one of the walls of the furnace containing the molten glass or the glass bath 2, and 3 represents the sheet of glass which is drawn upwardly from the bath by an appropriate bait or other drawing tool, the sheet being drawn through the usual drawing tools 26.

In Figure 1, shield members 27 are shown as placed parallel with the drawn glass sheet 3 to cut off and regulate the furnace heat from the side portions of the sheet. In Figure 1, are also shown the burner jets 30 to locally increase or decrease the temperature in the region where the edges of the sheet are drawn.
For convenience in illustration only one edge of the glass sheet is shown but it will be understood that the same parts may be duplicated at the opposite edge of the sheet.

In accordance with the invention I provide a slot member 10 preferably in the form of a plate, as shown more particularly in Figure 3. The plate is made with the slot 7 and the plate may be made of metal, refractory clay or other material. The slot 7 may be tapered if desired, narrowing upwardly as indicated in Figure 4, and the slot may be wider at its outer open portion and taper inwardly to the acute angle portion 11.

The plate 10 is perforated to receive the substantially vertical pivot bolt or pin 18 by which the plate may swing to a horizontal plane for purposes of adjustment. The pin 18 adjustably secures the plate 10 to the slotted link member 17 having the horizontally disposed closed slot. This link member 17 is secured to the pedestal or base member 16 having the vertical slot 19. A bolt or pivot pin 21 is made to pass through the slots 20 and 19, whereby to secure the link member 17 in adjusted position. The link member may be adjusted up and down the pedestal or base member 16; it may be adjusted horizontally by virtue of the slot 20, or it may pivot in a substantially vertical plane about the pin or fulcrum 21. A heating and cooling means may be provided in conjunction with the slot member if desired and in Figure 2, I illustrate one form of such device as consisting of the pipe 45 bent upon itself and supported as upon the arm 15. The pipe is provided with a valve 25 in its induction branch to control the blow of the cool or hot fluid medium thereto. The bight of the pipe may be disposed close to the portion of the plate 10 or glass edge forming member which is close to or in contact with the edge of the sheet. It will be understood that although the side walls of the slot in the slot member are shown as straight, these walls may be rounded, as shown in Figure 5.

In the furnace wall 1 is shown a pocket or channel 24 extending close to the point of generation of the edges of the sheet, and in this channel or pocket I dispose a pipe or nozzle 23 for conveying temperature-affecting medium to the pocket or channel under the control of a valve 25' to increase and decrease the viscosity of the glass at the source of the drawn edge.

According to the improved method and operation of the apparatus, the glass is gathered upon an appropriate bait or other tool from the free natural surface of the bath 2, the edges and margin portions being drawn upwardly through the slot members. These slot members are so positioned that their bottom portions either rest upon the surface of the glass or such slot members penetrate slightly below the top surface of the glass bath. At the base of the drawn sheet, when thus freely drawn, a thickened portion 4 naturally forms from the free surface of the bath. This portion forms in inverted V-shape. The slot members are placed at or in the bath of glass in position to receive the base portion of this thickened or wedge-shaped part of the glass sheet whereby to partially reduce this thickened portion at the edges and margin of the glass sheet.

Necessarily a retarding frictional action upon the upwardly drawn glass takes place in the slot member, resulting in the longitudinal stretching of the border portions of the sheet from the drawing device to the slot members, and this will also result in counteracting the transverse shrinkage of the sheet between the stretched border portions. Although it is not necessary that the glass adhere to the walls of the slot members, I prefer that the glass adhere thereto. The member 10 may be preheated before placing it in the bath to secure and maintain such adhesion, such adhesion producing a better edge and a better temper in the sheet. After being placed in the position indicated, the member will be retained in its heated condition by the furnace heat and the burners 30 may also assist toward this end. By the use of the pipe 45 or other device I am enabled to regulate the degree of the adhesion to insure that the width of the sheet will be maintained uniform during drawing and to produce an edge of desired thickness. At times the jet 24 may be put into operation to control the anchorage at the source of the drawn edge.

The plate 10 serves to protect the drawn edge of the sheet from the radiating heat from the bath. By reason of the position of the preheated edge forming members, the same are maintained hot and therefore adhere to the drawn glass. By use of the invention much breakage is eliminated.

From the above it will be understood that the edging members have slots which engage the tapering base of the drawn glass at a point below the upper reduced end of the tapering base, said slots being narrower than the normal thickness of said tapering base at the point of engagement therewith to partially reduce the thickness thereof, and being wider than the thickness of the finished edges of the sheet to create a dragging action at the contracted portion of the tapering base and at the same time preserving sufficient tapering thickness above the contracted portion to prevent injury to the draw.

What is claimed is:—

1. In apparatus for drawing sheet glass from the free surface of a bath of molten glass at a particular level, horizontal slotted plates provided with V-shaped slots and fixed with the lower portion thereof in contact with the glass bath through which the initially forming border portions of the sheet are drawn whereby to reduce in thickness and stretch said border portions.

2. In apparatus for drawing sheet glass from the free surface of a bath of molten glass at a particular level, horizontal slotted plates provided with V-shaped slots and fixed with the lower portion thereof in contact with the glass bath through which the initially-forming border portions of the sheet are drawn whereby to reduce in thickness and stretch said border portions, and anchorages in the bath at the source of the sheet located adjacent the plates.

3. The method for forming a sheet of glass consisting in drawing the sheet from a substantially open bath of molten glass and progressively shaping out the initially drawn portions of the sheet between and in adherent dragging contact with the outwardly diverging sides of slots in hot metallic plates while maintaining said metallic plates against movement and in contact with the surface of the bath, and protecting the rising border portion from the bath below during drawing.

4. In apparatus for drawing sheet glass from the free normal surface of a bath of molten glass at a particular level, horizontal slotted plates provided with V-shaped slots and having the lower portions thereof in the bath through which the initially drawn border portions of the sheet are drawn whereby to reduce in thickness and stretch said border portions, said slotted plates being positioned intermediately of the inverted wedge-shaped base portions of the drawn sheet to permit a reduced tapering portion of glass to pass above the slotted plates before being drawn into final reduced thickness in the glass edges.

5. In apparatus for drawing a sheet of glass, a receptacle for containing a bath of molten glass, horizontal plates having V-shaped open slots therein including means externally of said receptacle for supporting said plates fixed in contacting position with the glass of the bath adjacent the walls of said receptacle, and means for drawing the border portions of the sheet in shaping contact through said slotted plates and the remaining portions of the sheet from the free surface of the bath.

6. In sheet glass drawing apparatus, the combination with a tank for containing a bath of molten glass at a particular level, anchorage means in the walls of said tank, an edging device comprising a hot plate having an open V-shaped slot therein for receiving the border portion of the meniscus being drawn from which the sheet forms, the walls which form the slot being adapted to contact and adhere against the side faces of the rising border portion of the meniscus to prevent the narrowing of the sheet, said plate being of such form as to protect the forming border portion of the sheet from the bath below, means for holding said plates fixed in contact with the surface of the bath adjacent said anchorage means, and means for drawing the border portions of the meniscus in shaping contact through said slotted plates and the remaining portion of the sheet from the free surface of the bath.

In testimony whereof I affix my signature.

ARTHUR E. SPINASSE.